US006829762B2

United States Patent
Arimilli et al.

(10) Patent No.: US 6,829,762 B2
(45) Date of Patent: Dec. 7, 2004

(54) METHOD, APPARATUS AND SYSTEM FOR ALLOCATING AND ACCESSING MEMORY-MAPPED FACILITIES WITHIN A DATA PROCESSING SYSTEM

(75) Inventors: Ravi Kumar Arimilli, Austin, TX (US); Derek Edward Williams, Austin, TX (US)

(73) Assignee: International Business Machnies Corporation, Armonk, NY (US)

( * ) Notice: Subject to any disclaimer, the term of this patent is extended or adjusted under 35 U.S.C. 154(b) by 194 days.

(21) Appl. No.: 10/268,746

(22) Filed: Oct. 10, 2002

(65) Prior Publication Data

US 2004/0073766 A1 Apr. 15, 2004

(51) Int. Cl.[7] .................................................. G06F 9/46
(52) U.S. Cl. ........................ 718/1; 718/104; 711/202; 711/203; 711/152; 711/163; 710/200; 710/3; 713/1
(58) Field of Search ................................ 711/202, 203, 711/152, 158, 163; 710/200, 3; 713/1, 100; 718/1, 100, 104; 717/100

(56) References Cited

U.S. PATENT DOCUMENTS

| | | | | |
|---|---|---|---|---|
| 4,825,358 A | * | 4/1989 | Letwin | 713/1 |
| 5,347,636 A | * | 9/1994 | Ooi et al. | 711/203 |
| 5,619,671 A | * | 4/1997 | Bryant et al. | 711/202 |
| 5,826,084 A | * | 10/1998 | Brooks et al. | 718/107 |
| 5,937,185 A | * | 8/1999 | Weir et al. | 703/24 |
| 6,442,664 B1 | * | 8/2002 | Maynard et al. | 711/203 |
| 2002/0156962 A1 | * | 10/2002 | Chopra et al. | 711/3 |
| 2003/0208647 A1 | * | 11/2003 | Kumar et al. | 710/200 |

* cited by examiner

Primary Examiner—Hong Kim
(74) Attorney, Agent, or Firm—Casimer K. Salys; Brian F. Russell (57) ABSTRACT

Within a data processing system, a pool of facilities are allocated to an operating system, where each facility within the pool of facilities has an associated real address. The operating system allocates from the pool at least one bypass facility to a first process that the first process is permitted to directly access by its associated real address without first obtaining translation of a non-real address. The operating system also allocates from the pool at least one protected facility to a second process that the second process accesses only by translation of a non-real address to obtain the real address associated with the protected facility. Accesses to the facilities are either protected or unprotected based upon the state of a bypass field within a request address.

28 Claims, 9 Drawing Sheets

METHOD, APPARATUS AND SYSTEM FOR ALLOCATING AND ACCESSING MEMORY-MAPPED FACILITIES WITHIN A DATA PROCESSING SYSTEM

RELATED APPLICATIONS

The present invention is related to the subject matter of the following copending United States patent applications filed concurrently with this application:

1. U.S. Ser. No. 10/268,729 filed on Oct. 10, 2002 entitled "High Speed Promotion Mechanism Suitable For Lock Acquisition In A Multiprocessor Data Processing System";
2. U.S. Ser. No. 10/268,727 filed on Oct. 10, 2002 entitled "Method, Apparatus and System For Acquiring A Global Promotion Facility Utilizing A Data-Less Transaction";
3. U.S. Ser. No. 10/268,739 filed on Oct. 10, 2002 entitled "Method, Apparatus and System That Cache Promotion Information Within A Processor Separate From Instructions And Data";
4. U.S. Ser. No. 10/268,740 filed on Oct. 10, 2002 entitled "Method, Apparatus and System For Management Released Promotion Bits";
5. U.S. Ser. No. 10/268,742 filed on Oct. 10, 2002 entitled "Method, Apparatus and System For Accessing A Global Promotion Facility Through Execution Of A branch-Type Instruction"; and
6. U.S. Ser. No. 10/268,744 filed on Oct. 10, 2002 entitled "Method, Apparatus and System For Acquiring A Plurality Of Global Promotion Facilities Through Execution Of An Instruction".

The content of the above-referenced applications is incorporated herein by reference.

BACKGROUND OF THE INVENTION

1. Technical Field

The present invention relates in general to data processing and, in particular, to allocating and accessing resources within a data processing system. In at least one embodiment, the present invention relates still more particularly to a method and system for efficiently allocating and accessing promotion facilities, such as locks, in a data processing system.

2. Description of the Related Art

In shared memory multiprocessor (MP) data processing systems, each of the multiple processors in the system may access and modify data stored in the shared memory. In order to synchronize access to a particular granule (e.g., cache line) of memory between multiple processors, programming models often require a processor to acquire a lock associated with the granule prior to modifying the granule and release the lock following the modification.

In a multiprocessor computer system, multiple processors maybe independently attempting to acquire the same lock. In the event that a processor contending for a lock successfully acquires the lock, the cache line containing the lock is transmitted via the system bus from system memory or the cache hierarchy of another processor and loaded into the processor's cache hierarchy. Thus, the acquisition and release of locks in conventional data processing systems can be characterized as the movement of exclusively held cache lines between the data caches of various processors.

Lock acquisition and release is commonly facilitated utilizing special memory access instructions referred to as load-reserve and store-conditional instructions. In shared memory MP data processing systems that support load-reserve and store-conditional instructions, each processor within the system is equipped with a reservation register. When a processor executes a load-reserve to a memory granule, the processor loads some or all of the contents of the memory granule into one of the processor's internal registers and the address of the memory granule into the processor's reservation register. The requesting processor is then said to have a reservation with respect to the memory granule. The processor may then perform an atomic update to the reserved memory granule utilizing a store-conditional instruction.

When a processor executes a store-conditional to a memory granule for which the processor holds a reservation, the processor stores the contents of a designated register to the memory granule and then clears the reservation. If the processor does not have a reservation for the memory granule, the store-conditional instruction fails and the memory update is not performed. In general, the processor's reservation is cleared if a remote processor requests exclusive access to the memory granule for purposes of modifying it (the request is made visible to all processors on a shared bus) or the reserving processor executes a store-conditional instruction. If only one reservation is permitted per processor, a processor's current reservation will also be cleared if the processor executes a load-reserve to another memory granule.

A typical instruction sequence for lock acquisition and release utilizing load-reserve (lwarx) and store-conditional (stwcx) instructions is as follows:

| | | | |
|---|---|---|---|
| A | load X | ! | read lock value |
| | cmpi | ! | compare to determine if lock available |
| | bc A | ! | loop back if lock not available |
| B | lwarx X | ! | attempt to obtain reservation for lock |
| | cmpi | ! | determine if obtained reservation for lock |
| | bc A | ! | loop back if no reservation obtained |
| C | stwcx X | ! | attempt to set lock to "locked" state |
| | bc A | ! | loop back if store-conditional failed |
| | . . . | ! | do work on shared data to which access is synchronized by the lock |
| | store X | ! | release lock by resetting to "unlocked" state |

As indicated, the typical instruction sequence includes at least two separate branch "loops"—one (identified by "B") that is conditioned upon the processor obtaining a valid reservation for the lock through successful execution of the load-reserve instruction, and another (identified by "C") conditioned upon the processor successfully updating the lock to a "locked" state through execution of the store-conditional instruction while the processor has a valid reservation. The lock acquisition sequence may optionally include a third branch loop (identified by "A") in which the processor determines whether the lock is available prior to seeking a reservation for the lock.

This conventional lock acquisition sequence incurs high overhead not only because of its length but also because of the conditional nature of reservations. That is, a first processor may lose a reservation for a lock before successfully acquiring the lock (through execution of a store-conditional instruction) if a second processor stores to (or acquires ownership of) the lock first. Consequently, if a lock is highly contended, a processor may make a reservation for a lock and lose the reservation many times prior to successfully acquiring the lock through execution of a store-conditional instruction.

At least one processor manufacturer has tried to address this problem by implementing a "brute force" solution in which a processor executing a load-reserve instruction is granted exclusive access to the interconnect. That is, while the reservation is held by the processor, only the processor executing the load-reserve instruction is permitted to master operations on the interconnect, and all other processors are "locked out," not just from accessing a particular data granule, but from initiating any operation on the interconnect. Consequently, the processors locked out of the interconnect may stall for lack of data while the reservation is held. Obviously, this solution does not scale well, particularly for systems running code in which locks are highly contended.

SUMMARY OF THE INVENTION

The present invention recognizes that the conventional lock acquisition and release methodologies described above, although effective at synchronizing access by multiple processors to shared data, have a number of attendant shortcomings. First, conventional lock acquisition and release sequences that employ load-reserve and store-conditional instructions require the inclusion of special purpose reservation registers and reservation management circuitry within each processor, undesirably increasing processor size and complexity.

Second, as noted above, the typical lock acquisition and release sequence is inherently inefficient because of the conditional nature of reservations. If a lock is highly contended, multiple processors may gain and lose reservations for a lock many times before any processor is permitted to obtain the lock, update the lock to a "locked state," and do work on the data protected by the lock. As a result, overall system performance degrades.

Third, the lock acquisition and release methodologies outlined above do not scale well. For example, in the conventional lock acquisition instruction sequence, the overhead incurred in acquiring a lock increases with the scale of the data processing system. Thus, although it is more desirable in large-scale data processing systems having numerous processors to employ fine grain locks (i.e., a large number of locks that each protect a relatively small data granule) to enhance parallelism, the increasingly high lock acquisition overhead can force the adoption of coarser grain locks as system scale increases in order to reduce the percentage of processing time consumed by lock acquisition overhead. Such design compromises, though viewed as necessary, significantly diminish the amount of useful work that can be effectively distributed over multiple processors.

Fourth, because lock variables are conventionally treated as cacheable operand data, each load-type and store-type operation within the lock acquisition sequence triggers data cache directory snoops, coherency message traffic on the system bus, and other conventional operations dictated by the cache coherency protocol implemented by the data processing system. The present invention recognizes that these data-centric cache coherency operations, which consume limited system resources such as data cache snoop queues, bus bandwidth, etc., are not necessary because the data value of the lock itself is not required for or useful in performing the work on the data granule protected by the lock.

In view of the foregoing and other shortcomings of conventional techniques for acquiring and releasing locks in a data processing system, and more generally, of techniques for inter-component coordination and accessing memory-mapped resources, the present invention introduces, inter alia, new methods and apparatus for allocating and accessing memory-mapped resources such as a global promotion facility that is not limited to, but can be advantageously employed as, as a lock facility.

In accordance with the present invention, a multiprocessor data processing system includes a plurality of processors coupled to an interconnect and to a memory including an promotion facility containing at least one promotion bit field. A first processor among the plurality of processors executes a load-type instruction to acquire a promotion bit field within the global promotion facility exclusive of at least a second processor among the plurality of processors. In response to execution of the load-type instruction, a register of the first processor receives a register bit field indicating whether or not the promotion bit field was acquired by execution of the load-type instruction. While the first processor holds the promotion bit field exclusive of the second processor, the second processor is permitted to initiate a request on the interconnect. All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

As described above, the present invention recognizes that the shortcomings associated with conventional lock acquisition and release methodologies are at least partially attributable to the architectural definition of locks as operand data. That is, lock values are commonly accessed utilizing load-reserve and store-conditional atomic data access primitives, transmitted on the system interconnect during data tenures, stored within the operand data caches of processor cache hierarchies, and managed together with other operand data utilizing data cache coherency mechanisms.

To reduce or eliminate the problems attendant conventional lock acquisition and release methodologies, the present invention introduces a new class of information referred to herein as "promotion information." That is, rather than bifurcating the universe of addressable information subject to communication between components of a multiprocessor system into "instructions" and "operand data," the present invention introduces the additional information class of "promotion information," which includes locks. Such promotion information determines which components of a data processing system (e.g., processors, controllers, adapters, etc.) are authorized or permitted to perform particular activities associated with the promotion information. As will become apparent, software and hardware architectural enhancements are made to manage "promotion information" independently of operand data (as well as instructions), greatly simplifying and improving performance of the lock acquisition and release process.

Figure 1:
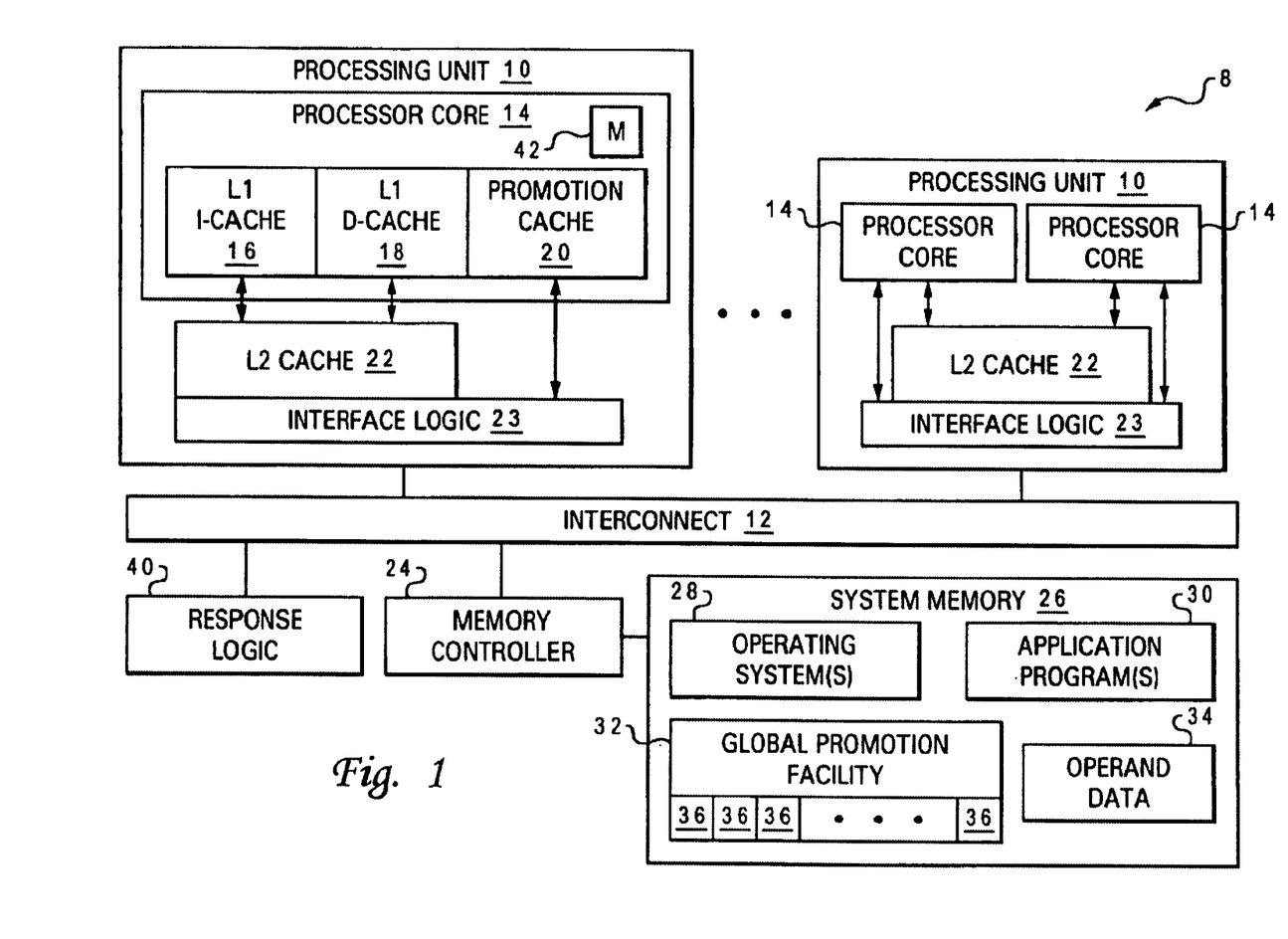
FIG. 1 depicts an illustrative embodiment of a multiprocessor data processing system in accordance with one embodiment of the present invention.

With reference now to the figures and in particular with reference to FIG. 1, there is illustrated a high-level block diagram of a multiprocessor (MP) data processing system that supports improved management of locks and other promotion information in accordance with one embodiment of the present invention. As depicted, data processing system 8 includes multiple (e.g.,64) processing units 10 coupled for communication by a system interconnect 12. Each processing unit 10 is a single integrated circuit including interface logic 23 and one or more processor cores 14. In addition to the registers, instruction flow logic and execution units utilized to execute program instructions, each of processor cores 14 includes associated level one (L1) instruction and data caches 16 and 18, which temporarily buffer instructions and operand data, respectively, that are likely to be accessed by the associated processor core 14.

As further illustrated in FIG. 1, the memory hierarchy of data processing system 8 also includes one or more system memories 26, which form the lowest level of volatile data storage in the memory hierarchy, and one or more lower levels of cache memory, such as on-chip level two (L2) caches 22, which are utilized to stage instructions and operand data from system memory 26 to processor cores 14. As understood by those skilled in the art, each succeeding lower level of the memory hierarchy is typically capable of storing a larger amount of data than higher levels, but at higher access latency.

As shown, system memory 26, which is interfaced to interconnect 12 by memory controller 24, may store operand data 34 and portions of one or more operating systems 28 and one or more application programs 30. In addition, system memory 26 may include a global promotion facility 32 allocated (e.g., at boot time) by operating system(s) 28. Although illustrated as a facility within system memory, those skilled in the art will appreciate that global promotion facility 32 may alternatively be implemented within a system or bus controller, bus bridge, response logic, or other component of data processing system 8.

Global promotion facility 32 includes a number (e.g., 1024) of individual promotion bits 36 that can be utilized to facilitate inter-component coordination, for example, regarding interrupts, locks, task scheduling, event detection, error conditions, permissions, etc. Although not limited to such application, some or all of promotion bits 36 may be allocated as locks and may be associated by operating system(s) 28 or application program(s) 30 with respective data granules of operand data 34 to which access by multiple processor cores 14 is to be synchronized. For example, a promotion bit value of "1" may indicate that the lock is taken and the associated data granule is locked to access by processor cores 14 not holding the lock. Conversely, a promotion bit value of "0" may indicate that the lock is free and the associated data granule is unlocked. Memory controller 24 is preferably programmed to set a promotion bit promotion bit 36 (e.g., to "1") on a read access and to reset (e.g., to "0") a promotion bit on a write access.

To reduce access latency to global promotion facility 32, each processor core 14 may optionally be equipped with a promotion cache 20, which locally caches one or more promotion bits 36 accessed by the associated processor core 14, as described further below. Each promotion cache 20 can be implemented as a direct mapped or set associative cache, but is preferably implemented as a fully associative cache to enable promotion caches 20 to support greater or fewer promotion bits 36 (as determined by operating system(s) 28) without any hardware modification.

System interconnect 12, which can comprise one or more buses, a switch fabric, or other interconnect architecture, serves as a conduit for communication among the devices (e.g., processing units 10, memory controller 24, etc.) coupled to system interconnect 12. A typical transaction on system interconnect 12 begins with a request, which may include a transaction field indicating the type of transaction, one or more tags indicating the source and/or intended recipient(s) of the transaction, and an address and/or data. Each device connected to system interconnect 12 preferably snoops all relevant transactions on system interconnect 12 and, if appropriate, responds to the request with a snoop response. As discussed further below, such snoop responses are received and compiled by response logic 40, which provides a collective combined response indicating what action, if any, each snooper is to take in response to the request. These actions may include sourcing data on system interconnect 12, storing data provided by the requesting snooper, invalidating cached data, etc. Although illustrated separately, it should be understood that response logic 40 may alternatively be incorporated within a particular device (e.g., memory controller 24) or may be distributed among various devices (e.g., processing units 10) such that different devices (e.g., the masters of each transaction) compile the snoop responses to produce the combined response for different transactions.

Those skilled in the art will appreciate that data processing system 8 can include many additional unillustrated components, such as I/O adapters, interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to MP data processing systems of any architecture and are in no way limited to the generalized MP architecture illustrated in FIG. 1.

Figure 2A:
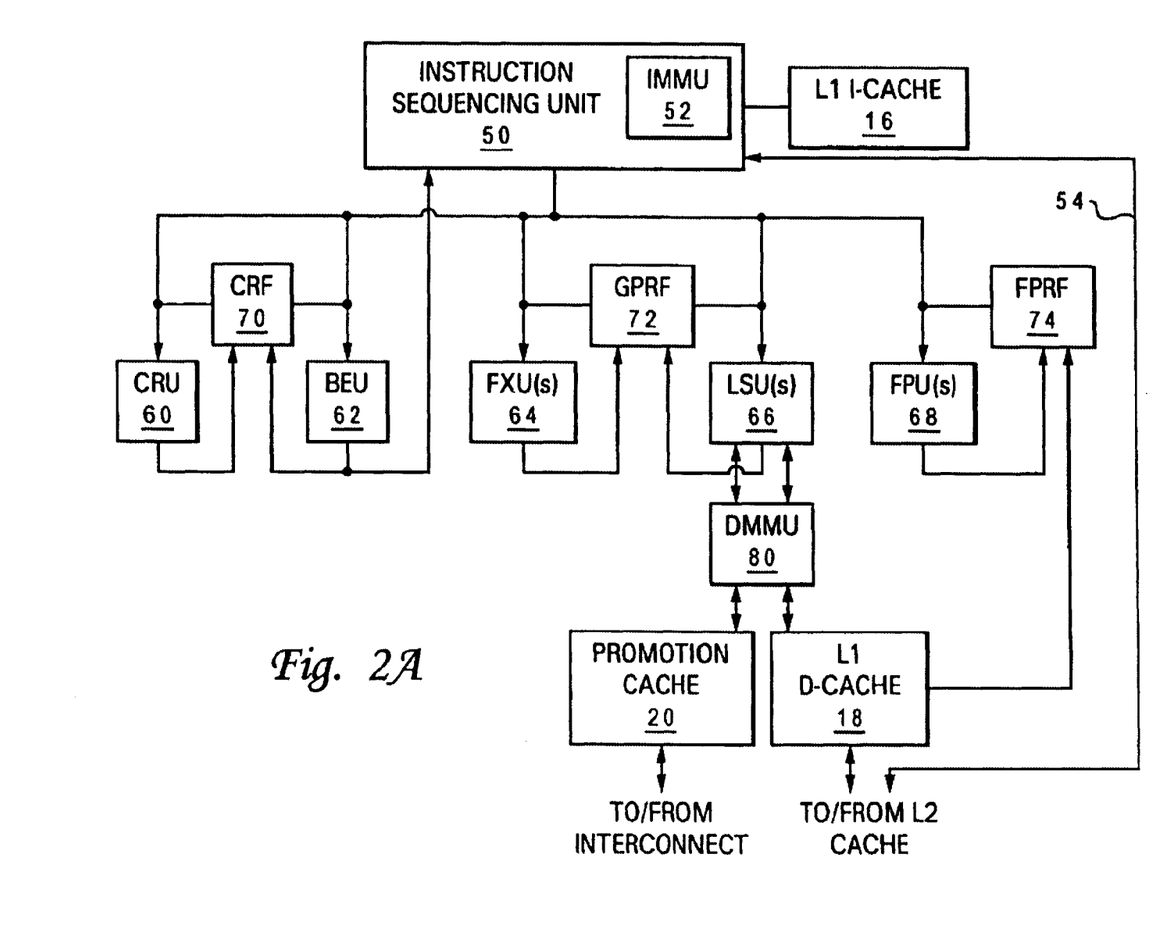
FIGS. 2A and 2B are more detailed block diagrams of two alternative embodiments of a processor core in accordance with the present invention.

Referring now to FIG. 2A, there is depicted a more detailed block diagram of a first embodiment of a processor core 14 in accordance with the present invention. As shown, processor core 14 has an instruction sequencing unit 50 that fetches instructions for processing from L1 I-cache 16 utilizing real addresses obtained by the effective-to-real address translation (ERAT) performed by instruction memory management unit (IMMU) 52. Of course, if the requested cache line of instructions does not reside in L1 I-cache 16, then ISU 50 requests the relevant cache line of instructions from L2 cache 22 via I-cache reload bus 54.

After instructions are fetched and preprocessing, if any, is performed, instructions are dispatched to execution units 60–68, possibly out-of-order, based upon instruction type. That is, condition-register-modifying instructions and branch instructions are dispatched to condition register unit (CRU) 60 and branch execution unit (BEU) 62, respectively, fixed-point and load/store instructions are dispatched to fixed-point unit(s) (FXUs) 64 and load-store unit(s) (LSUs) 66, respectively, and floating-point instructions are dispatched to floating-point unit(s) (FPUs) 68. After possible queuing and buffering, the dispatched instructions are executed opportunistically by execution units 60–68.

During execution within one of execution units 60–68, an instruction may receive input operands, if any, from one or more architected and/or rename registers within a register file 70–74 coupled to the execution unit. Data results of instruction execution (i.e., destination operands), if any, are similarly written to register files 70–74 by execution units 60–68. For example, FXU 64 receives input operands from and stores destination operands to general-purpose register file (GPRF) 72, FPU 68 receives input operands from and stores destination operands to floating-point register file (FPRF) 74, and LSU 66 receives input operands from GPRF 72 and causes data to be transferred between L1 D-cache 18 and both GPRF 72 and FPRF 74. Similarly, when executing condition-register-modifying or condition-register-dependent instructions, CRU 90 and BEU 92 access control register file (CRF) 70, which in a preferred embodiment contains a condition register, link register, count register and rename registers of each. BEU 92 accesses the values of the condition, link and count registers to resolve conditional branches to obtain a path address, which BEU 62 supplies to instruction sequencing unit 50 to initiate instruction fetching along the indicated path. After an execution unit finishes execution of an instruction, the execution unit notifies instruction sequencing unit 50, which schedules completion of instructions in program order.

Figure 2B:
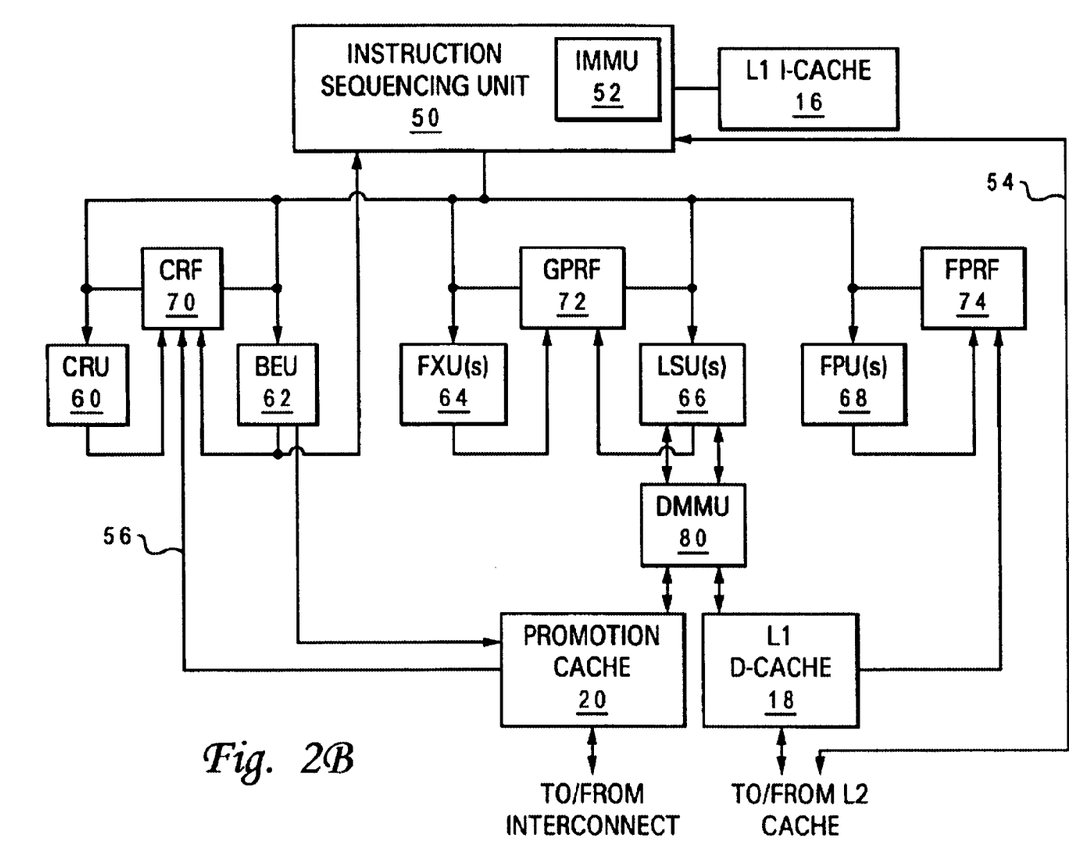

In the processor architecture depicted generally in FIG. 2A, various execution units (and therefore differing instruction sequences) may be employed to access promotion cache 20 to acquire and release locks and perform other inter-component coordination functions. For example, FIG. 2A illustrates an implementation in which LSU 66 accesses promotion bits 36 (within optional promotion cache 20 or from global promotion facility 32) in response to special-purpose or general-purpose load and store instructions. FIG. 2B depicts an alternative second embodiment in which BEU 62 sets a promotion bit 36 (e.g., to acquire a lock) within optional promotion cache 20 or within global promotion facility 32 in response to a special branch instruction, and LSU 66 resets a promotion bit 36 (e.g., to release a lock) in response to a store instruction. Of these and other design options within the scope of the present invention, differing designs may be preferable, depending upon implementation-specific details (e.g., gate counts, layout and routing efficiencies, instruction set architecture, etc.) known to those skilled in the art.

Figure 3:
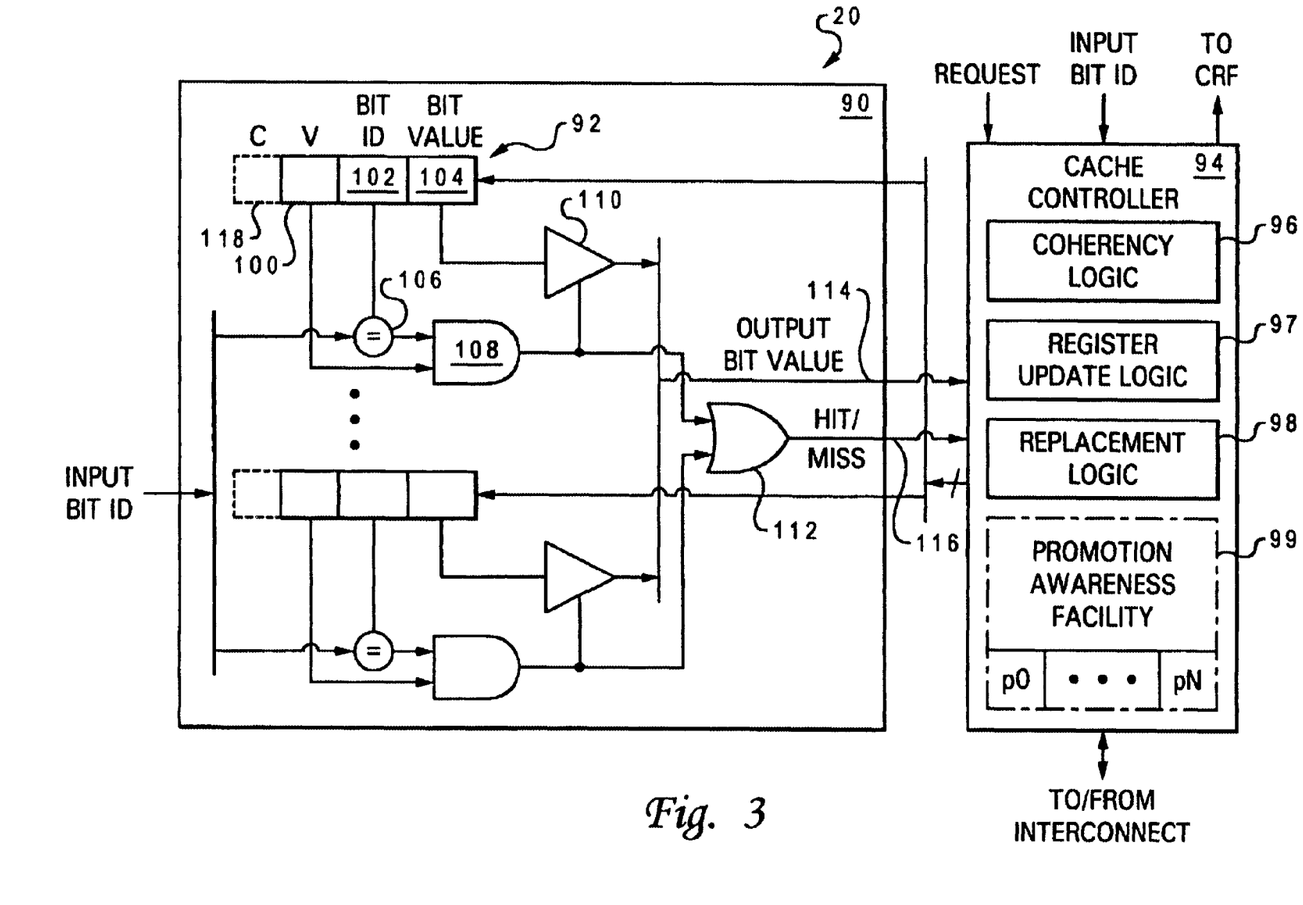
FIG. 3 is a more detailed block diagram of an embodiment of a promotion cache in accordance with the present invention.

With reference now to FIG. 3, there is illustrated a more detailed block diagram of a promotion cache 20 of a processor core 14 in accordance with a preferred embodiment of the present invention. As shown, promotion cache 20 includes a fully associative cache array 90 containing one or more entries 92. Each entry 92 within cache array 90 includes a valid bit field 100, a bit ID field 102, and a bit value field 104 indicating whether the associated processor core 14 currently holds the promotion bit 36 (e.g., lock) identified within bit ID field 102. For example, a bit value of "1" indicates that the associated processor core 14 holds the lock, and a bit value of "0" indicates that the lock is free.

Associated with each entry 92 is an access circuit including a comparator 106, AND gate 108, and a buffer 110. Comparator 106 compares an input bit ID received from the associated processor core 14 or system interconnect 12 with the bit ID stored within the associated entry 92 and outputs a 1-bit hit/miss indication indicating whether the input bit ID and stored bit ID match. This hit/miss signal is qualified by AND gate 108 with the state of valid field 100, and if the qualified signal indicates a hit, buffer 110 outputs the bit value contained in bit value field 104. The qualified hit/miss signals output by all of AND gates 108 are received as inputs by OR gate 112, which outputs a 1-bit collective hit/miss indication 116. Hit/miss indication 116 and the output bit value 114, if any, are received by a cache controller 94.

Cache controller 94 comprises a collection of logic that manages access to and updates and coherency of cache array 90. In the illustrated embodiment, cache controller 94 includes coherency logic 96, register update logic 97, replacement logic 98, and an optional promotion awareness facility 99.

Coherency logic 96 maintains coherency between the contents of promotion caches 20 and the global promotion facility 32 within system memory 26. Numerous implementations of coherency logic 96 are possible, of which various ones may be preferable for different systems depending upon desired complexity, performance, number of frequently contended locks, etc.

In general, coherency logic 96 maintains coherency by managing the states of valid bit fields 100 and/or bit value fields 104 in response to requests by both the local processor core 14 and remote processor cores 14. In an exemplary implementation in which no additional coherency field 118 is implemented, coherency logic 96 permits only one promotion cache 20 at a time to have a valid entry 92 containing a particular promotion bit 36 from global promotion facility 32. Table I provides a summary of the operations of coherency logic 96 according to this exemplary implementation.

TABLE I

| Input | Snoop Response | Action |
|---|---|---|
| Load request by local processor core hits in cache array while lock taken | — | Retry processor core |
| Load request by local processor core hits in cache array while lock free | — | Set bit value field to indicate acquisition of lock |
| Load request by local processor core misses in cache array | — | Issue address-only read request on interconnect to request lock; in response to CR indicating lock acquired, allocate entry and set bit value field to indicate lock acquisition |
| Store request by local processor core hits in cache array while lock taken | — | Reset bit value field to indicate release of lock |
| Deallocation of entry from cache array without snooping request | — | Reset promotion bit within global promotion facility by issuing address-only write operation on |

TABLE I-continued

| Input | Snoop Response | Action |
|---|---|---|
| by remote processor core | | interconnect targeting bit ID of deallocated bit |
| Request by remote processor core misses | Null | None |
| Request by remote processor core hits in cache array while lock taken | Retry | None |
| Request by remote processor core hits in cache array while lock free | Intervention | Reset valid bit field associated with entry for which hit occurred |

It should be noted that in the implementation summarized in Table I (as well as other implementations) writeback of the state of a promotion bit 36 to global promotion facility 32 to inform global promotion facility 32 of the release of a lock can optionally be delayed from the time of release until deallocation of the promotion bit 36 by all promotion caches 20. During the period that global promotion facility 32 is not synchronized with promotion caches 20 (e.g., global promotion facility 32 indicates that a lock has been acquired by a processor core 14 while in fact the lock is indicated within a promotion cache 20 as free), memory controller 24 will respond to a read request targeting the lock with a snoop response indicating that a lock is taken. Processor cores 14, on the other hand, will provide either Null or Intervention snoop response (i.e., no processor core 14 provides a Retry snoop response). In response to these snoop responses, response logic 40 will provide a combined response indicating that the lock acquisition request is granted to the requesting processor core 14.

In other embodiments of coherency logic 96, each promotion cache 20 may permit promotion bits 36 to be cached concurrently within the promotion caches 20 of multiple processor cores 14. Such embodiments may decrease average lock acquisition overhead, particularly for highly contended locks, but concomitantly increase cache complexity. For example, each entry 92 of a promotion cache 20 is equipped with a coherency field 118 in addition to (or in lieu of) valid bit field 100 to track the coherency state of promotion bit 36 cached in that entry 92, and coherency logic 99 additionally implements a coherency protocol, such as the well known Modified, Exclusive, Shared, Invalid (MESI) cache coherency protocol or a variant thereof.

Cache controller 94 also includes register update logic 97 that updates one or more selected registers within processor core 14 in response to an access to promotion cache 20. For example, register update logic 97 may update a general-purpose register within GPRF 72 with the lock value (e.g., 0 or 1) in response to lock acquisition or release instructions targeting global promotion facility 32. Alternatively or additionally, as illustrated in FIG. 2B at reference numeral 56, register update logic 97 may update one or registers within CRF 70 (e.g., a link register, condition register, or special purpose lock register) in response to lock acquisition and release instructions targeting global promotion facility 32.

Cache controller 94 further includes replacement logic 98 that replaces a selected entry 92 of cache array 90 in response to an access request missing in promotion cache 20. Replacement logic 98 may implement a conventional cache replacement algorithm such as Least Recently Used (LRU) or Most Recently Used (MRU), or alternatively, may replace promotion bits 36 based upon individual or group priority, which can be dynamically determined (e.g., by operating system(s) 28) or statically determined at startup. In this second implementation, higher priority locks are advantageously prevented from being displaced by lower priority locks, further improving lock acquisition efficiency. In implementations in which the locks are managed by replacement logic 98 in various priority groups in which the locks of each group share the same priority level, cache array 90 is effectively partitioned into multiple independent caches (e.g., at least one higher priority cache and at least one lower priority cache) by the groupings. Within such partitions, locks sharing a same priority level may be selected by replacement logic 98 for replacement according to access order (e.g., LRU or MRU).

Optional promotion awareness facility 99 provides further enhancements to the method by which the release and/or cache deallocation (victimization) of promotion bits is handled. In particular, promotion awareness facility 99 may track the particular promotion bit 36, if any, that has been most recently requested (or most recently unsuccessfully requested based upon the CR value) by each other processing unit 10 or other component (indicated in FIG. 3 as p0–pN) based upon address-only requests snooped on interconnect 12. Alternatively or additionally, promotion awareness facility may provide a table indicating, for each promotion bit 36, the processing unit 10 (or other component) that has the oldest outstanding (i.e., unsatisfied) or highest priority request for that promotion bit 36. If desired, the amount of information promotion awareness facility 99 stores regarding snooped requests for promotion bits 36 can be limited by recording the processing unit 10 (or other component) that is the oldest unsatisfied requester (or highest priority requestor) of only the promotion bits 36 that are cached within the associated promotion cache 20 or held by the associated processor core 14.

If replacement logic 98 selects a promotion bit for deallocation from cache array 90 that is indicated by promotion awareness facility 99 as requested by a processing unit 10, cache controller 94 can source (push) the promotion bit 36 to the indicated processing unit 10 without receiving another request by transmitting an unsolicited address-only push operation on interconnect 12. If promotion awareness facility 99 indicates the deallocated promotion bit 36 is concurrently desired by multiple processing units 10 (as is often the case for highly contended locks), replacement logic 98 preferably pushes the deallocated promotion bit 36 to the processing unit 10 that has the oldest outstanding (or highest priority) request for the promotion bit 36. The push operation can alternatively be issued by cache controller 94 in response to release of the promotion bit 36 rather than waiting for deallocation from promotion cache 20 if promotion awareness facility 99 indicates that another processing unit 10 (or other component) has requested the promotion bit 36 or has an unsatisfied outstanding request for the promotion bit 36. If for some reason the push operation fails (e.g., the target processing unit 10 has no snoop queues available), memory controller 24 preferably updates global promotion facility 32 to indicate that the deallocated promotion bit 36 is available and assumes "ownership" of the deallocated promotion bit 36.

As address-only promotion push operations and address-only promotion request operations are snooped, the cache controller 94 in each cache may clear the entry in its promotion awareness facility 99 corresponding to the target processing unit 10 of the push operation. In addition, if a processing unit 10 no longer wants to acquire a previously requested promotion bit 36 (e.g., the processing unit 10 unsuccessfully requested the promotion bit 36 a predetermined number of times and then switched processes), the processing unit 10 can transmit an address-only operation on interconnect 12 requesting that other processing units 10 clear the corresponding entry from their promotion awareness facilities 99. An entry within promotion awareness facility 99 for a particular processing unit 10 is also updated to a new value in response to snooping a request by the particular processor 10 for a different promotion bit 36.

It should be noted that the implementation of a promotion awareness facility 99 does not require the implementation of a promotion cache 20 and may be implemented within processing units 10 not having a promotion cache 20. Moreover, a promotion awareness facility 99 in accordance with the present invention may further be employed even in otherwise conventional data processing systems that employ data cache lines as locks. It should further be recognized that the level of precision with respect to the communication and management of promotion requests can vary between implementations, based upon interconnect topologies, protocols, and other factors.

Figure 4:
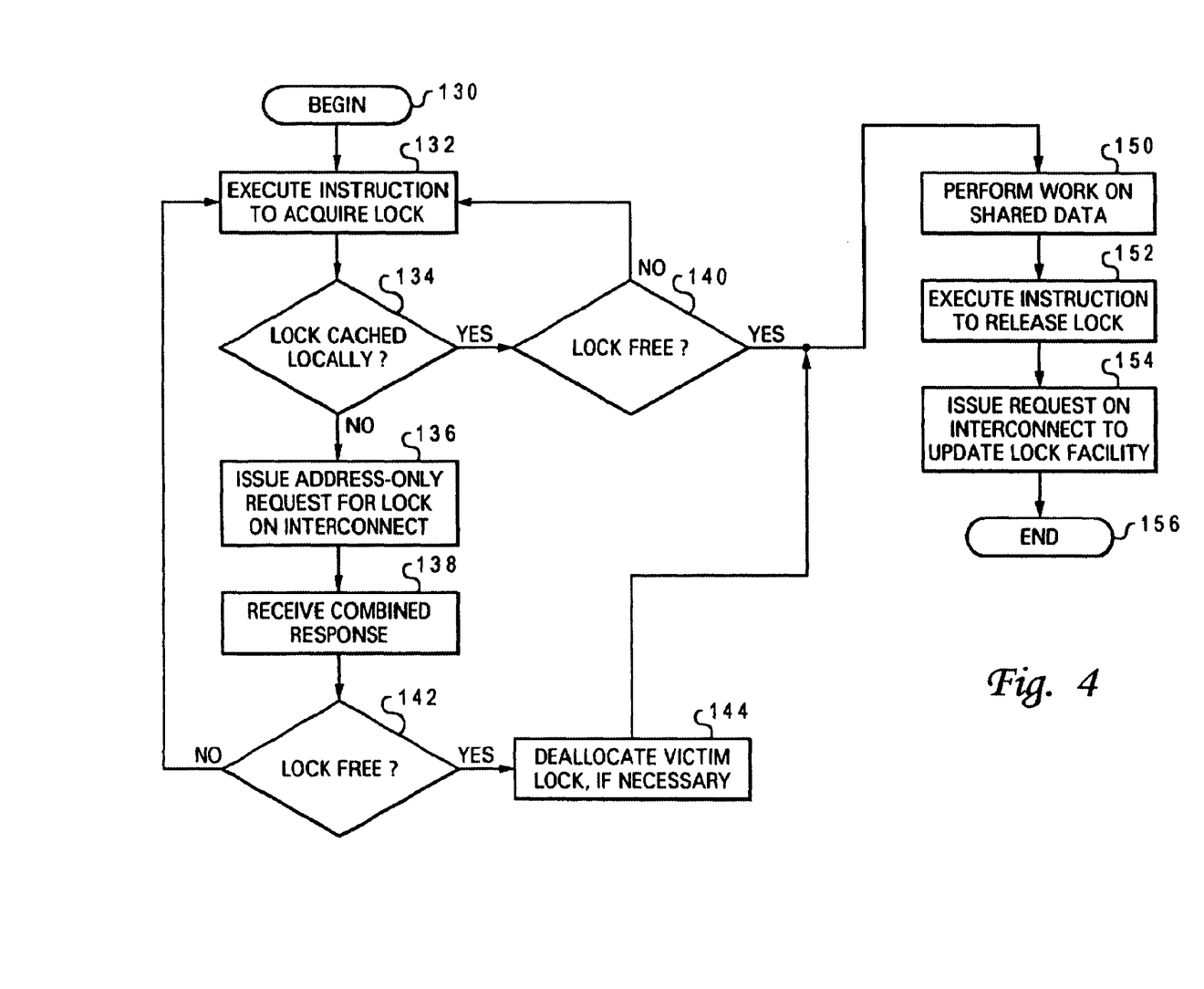
FIG. 4 is a high level logical block diagram of a lock acquisition and release process in accordance with the present invention.

Referring now to FIG. 4, there is depicted a high level logical flowchart of a method by which a processor core 14 acquires a lock associated with a shared data granule and thereafter releases the lock in accordance with the present invention. As illustrated, the process begins at block 130 and thereafter proceeds to block 132, which depicts a processor core 14 executing a lock acquisition instruction to acquire a lock for a particular data granule.

For example, in a first embodiment, the instruction executed to acquire a lock may be a general-purpose or special load instruction targeting the base address of global promotion facility 32, where the load instruction identifies with an operand the particular promotion bit 36 utilized for the lock. In this first embodiment, the lock acquisition and release instruction sequence can be represented as follows:

```
A   load (bit ID)   ! attempt to acquire lock for data granule
    cmpi            ! determine whether acquired lock (bit value = 0?)
    bc A            ! if did not acquire lock, loop back
    ...             ! if acquired lock, do work on shared granule
    store (bit ID)  ! reset bit value to 0 to release lock
```

In the processor core embodiment illustrated in FIG. 2A, instruction sequencing unit 50 dispatches the load instruction utilized to acquire the lock to an LSU 66 for execution. LSU 66 executes the load instruction by calculating the effective or real address of global promotion facility 32. This request address is then translated, if necessary, to a real address by DMMU 80 and, based upon this translation (e.g., through a table lookup in a block address table (BAT)), presented to promotion cache 20 rather than L1 data cache 18 (if a promotion cache 20 is implemented).

In a second embodiment, the instruction sequence utilized to acquire a lock may be further shortened by utilizing as the lock acquisition instruction a special branch instruction identifying with an operand the particular promotion bit 36 utilized for the lock. In this second embodiment, the lock acquisition and release sequence can be represented as follows:

```
A   bc bit ID, A    ! attempt to acquire lock for data granule; if did
                    ! not acquire lock, loop back
    ...             ! if acquired lock, do work on shared granule
    store (bit ID)  ! reset bit value to 0 to release lock
```

In the processor core embodiment illustrated in FIG. 2B, instruction sequencing unit 50 dispatches the conditional branch instruction utilized to acquire the lock to BEU 62 for execution. BEU 62 executes the branch instruction by issuing to promotion cache 20 an access request specifying the bit ID.

As illustrated at block 134 of FIG. 4, in response to an access request, cache controller 94 determines by reference to the hit/miss indication 116 and output bit value 114 provided by cache array 90 whether or not the promotion bit 36 utilized for the lock is cached within promotion cache 20. If so, register update logic 97 updates a register within processor core 14 (e.g., a general-purpose register within GPRF 72 or selected register within CRF 70) with the bit value of the lock. A determination is then made at block 140 whether the lock is free, for example, by reference to the bit value of a register within GPRF 72 or CRF 70. If not, the process returns to block 132, which has been described. If, however, the lock is successfully acquired, the process proceeds from block 140 to block 150 and following blocks, which are described below.

Figure 5:
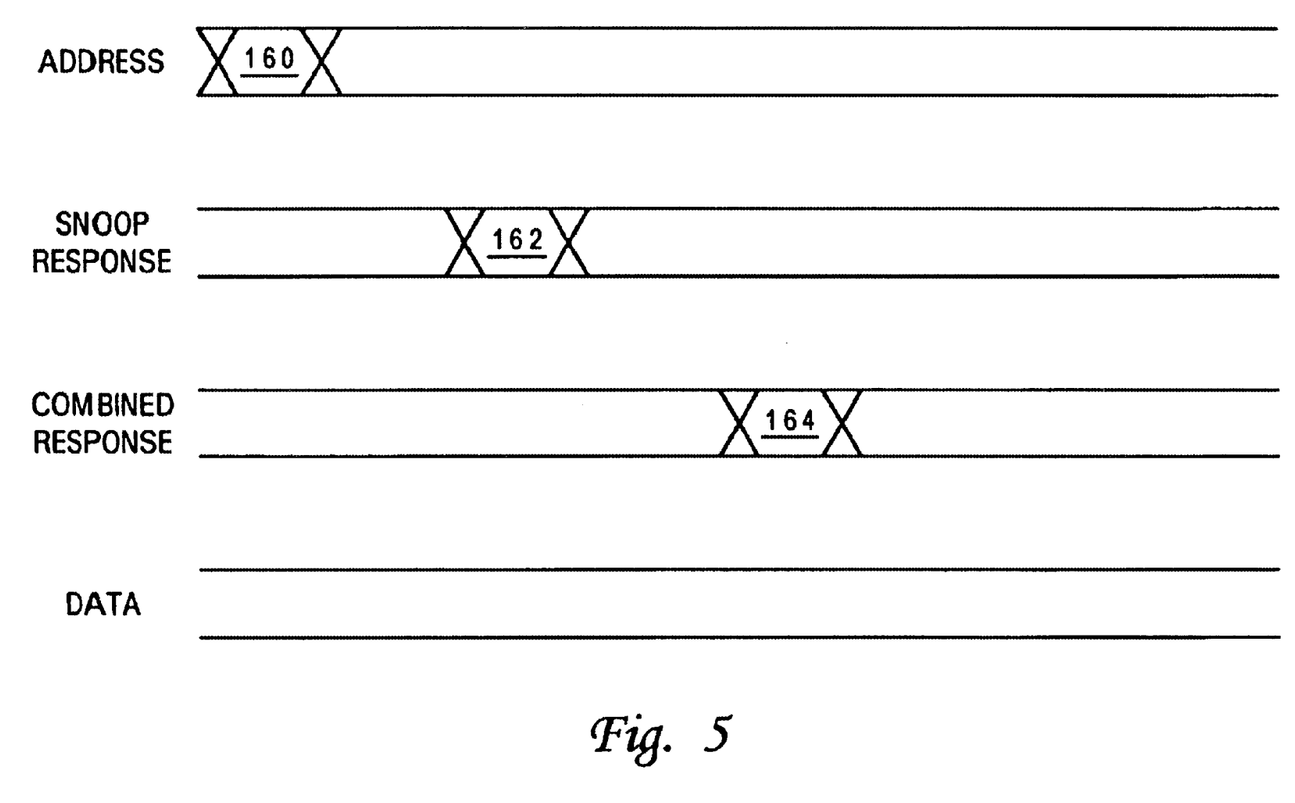
FIG. 5 is a timing diagram illustrating an address-only read transaction on a system interconnect that is utilized to acquire a lock in accordance with the present invention.

Returning to block 134, if the processor core's access request misses in promotion cache 20 (or if no promotion cache 20 is implemented), the process proceeds to block 136, which depicts processor core 14 (and in embodiments including promotion cache 20, the cache controller 94) issuing on interconnect 12 (via interface logic 23) an address-only read request targeting the lock, as depicted in FIG. 5 at reference numeral 160. In response to snooping the address-only read request, devices (e.g., processing units 10, memory controller 24, etc.) coupled to interconnect 12 provide snoop responses, illustrated collectively at reference numeral 162 of FIG. 5. As discussed above, response logic 40 compiles these snoop responses 162 to produce a single combined response (CR) 164, which represents a collective response of the snooping devices providing snoop responses. Combined response 164 is provided to at least the processing unit 10 issuing the read request targeting the lock as indicated at block 138 of FIG. 4, and more preferably, to all agents snooping the transaction.

As shown in FIG. 5, in contrast to conventional methods of lock acquisition, address-only read request 160 does not have any associated data tenure on system interconnect 12 that provides the lock value. Instead, combined response 164 indicates to the requesting processor core 14 whether or not the lock was successfully acquired. For example, in the embodiment described above, a Retry combined response generally indicates that the lock is currently taken by another processor core 14, and any other combined response indicates that the lock is available to the requesting processor core 14. It is preferable in determining the combined response if the highest point of promotion "ownership" (i.e., a promotion cache 20 if the promotion bit is cached and otherwise global promotion facility 36) can always grant a promotion bit 36 to a requester regardless of Retry responses of individual snoopers. As noted above, cache controller 94 allocates an entry 92 within cache array 90 in response to a combined response indicating acquisition of the lock.

The process proceeds from block 138 through block 142 and returns to block 132 in the event that the combined response does not indicate acquisition of the lock was successful. However, in the event that lock acquisition was successful, the process proceeds to block 144, which illustrates deallocation of a selected victim promotion bit from promotion cache 20, if necessary. As noted above, the deallocated promotion bit 36 may be returned to global promotion facility 32 or pushed directly to another processing unit 10 (or other component).

Following block 144, the process passes to block 150, which illustrates the processor core 14 processing (e.g., modifying) the shared data associated with the lock, for example, through execution of instructions by FXUs 64 and FPUs 68. In contrast to the prior art systems noted above that lock the system interconnect to processors not holding a reservation, processor cores 14 of data processing system 8 can master requests on system interconnect 12 and acquire locks for other data granules while the processor core 14 holds the lock.

After completing processing on the shared data granule associated with the lock, processor core 14 executes a lock release instruction (e.g., a store instruction) to release the lock, as shown at block 152. Thereafter, the processor core 14 that held the lock (or another processor core 14 that later acquires the lock) eventually issues a write request on interconnect 12 to update global promotion facility 32 to indicate the release of the lock. Thereafter, the process terminates at block 156.

Further refinements to the foregoing method and apparatus for lock acquisition may be advantageous for certain applications. First, it may be desirable to aggregate multiple promotion bits 36 (e.g., locks) so that all of the promotion bits 36 are atomically obtained by one processor core 14 in response to a single lock acquisition instruction or the acquisition attempt fails for all of the promotion bits 36.

Several embodiments of aggregated promotion bits 36 are possible. For example, if load-reserve and store-conditional instructions are employed in a lock acquisition sequence, the store-conditional instruction may be implemented with multiple operands, such that the store-conditional instruction completes successfully (i.e., updates the lock value) only if the processor core holds valid reservations for all of the locks specified by the multiple operands of the store-conditional instruction. Thus, the conventional lock acquisition sequence set forth above may be rewritten as:

| A | load X | ! read lock value |
|---|---|---|
|  | cmpi | ! compare to determine if lock available |
|  | bc A | ! loop back if lock not available |
| B | lwarx X | ! attempt to obtain reservation for lock |
|  | cmpi | ! determine if obtained reservation for lock |
|  | bc A | ! loop back if no reservation obtained |
| C | load Y | ! read lock value |
|  | cmpi | ! compare to determine if lock available |
|  | bc C | ! loop back if lock not available |
| D | lwarx Y | ! attempt to obtain reservation for lock |
|  | cmpi | ! determine if obtained reservation for lock |
|  | bcC | ! |
| E | load Z | ! read lock value |
|  | cmpi | ! compare to determine if lock available |
|  | bc E | ! loop back if lock not available |
| F | lwarx Z | ! attempt to obtain reservation for lock |
|  | cmpi | ! determine if obtained reservation for lock |
|  | bc E | ! |
| G | stwcx X,Y,Z | ! attempt to set all locks to "locked" state in concert |
|  | bc A | ! loop back if store-conditional failed |
|  | . . . | ! do work on shared data to which access is synchronized by locks X, Y and Z |
|  | store X | ! release lock by resetting to "unlocked" state |
|  | store Y | ! release lock by resetting to "unlocked" state |
|  | store Z | ! release lock by resetting to "unlocked" state |

Similarly, the load or branch lock acquisition instruction executed by a processor core 14 to acquire a lock and/or the interconnect operation utilized to convey a lock request can be implemented with multiple operands (or a bit mask) to indicate multiple locks that must be obtained in concert. To limit the size of the operand field, it may be desirable in some embodiments to simply specify a group of promotion bits 36 grouped by software (e.g., group 1, which is specified by software to include promotion bits 3, 27, 532 and 1000). If all the specified promotion bits 36 are free, all of the specified promotion bits 36 are acquired by the processor core 14 and set to "1"; otherwise, the lock acquisition attempt fails for all of the specified promotion bits 36.

Of course, bundling or aggregating promotion bits 36 in this manner reduces the success rate of lock acquisition requests in that all locks must be available at the same time. However, for many types of workloads, performance is nevertheless increased by bundling locks since individual locks within a group of locks needed to perform a particular activity are not individually held until all of the locks in the group become available.

Advantage can be taken of implementation of global promotion facility 32 as a software-managed resource to achieve flexibility in addressing and security. Software could additionally partition global promotion facility 32 or define affinity between processor cores 14 and promotion bits 36 so that only particular processor cores 14 can acquire certain promotion bits 36. These concepts can best be appreciated by reference to FIGS. 6-8.

Figure 6:
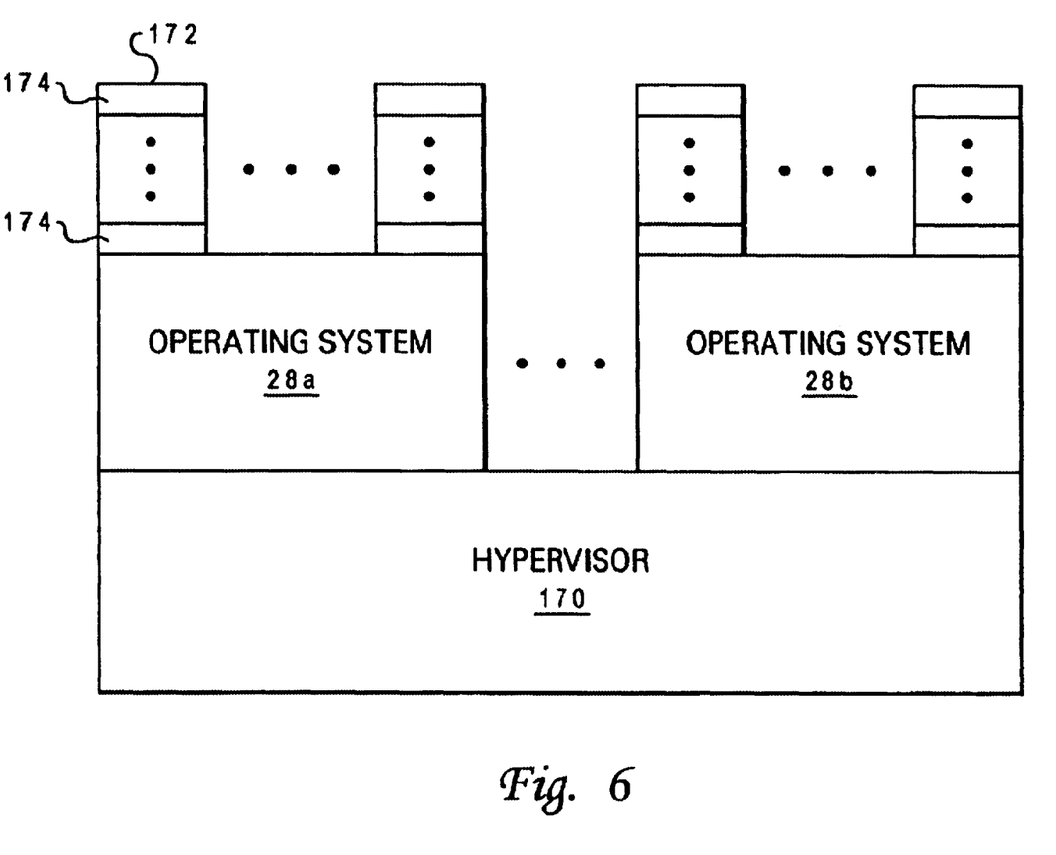
FIG. 6 is a software layer diagram of an exemplary software configuration of a multiprocessor data processing system in accordance with the present invention.

Referring now to FIG. 6, there is illustrated a software layer diagram of an exemplary software configuration of data processing system 8 of FIG. 1. As illustrated, the software configuration has at its lowest level an operating system supervisor (or hypervisor) 170 that allocates resources among one or more operating systems 28 concurrently executing within data processing system 8. The resources allocated to each instance of an operating system 28 are referred to as a partition. Thus, for example, hypervisor 170 may allocate two processing units 10 to the partition of operating system 28*a*, four processing units 10 to the partition of operating system 28*b*, and certain ranges of real and effective address spaces to each partition. Included within the resources allocated to each partition by hypervisor 170 are promotion bits 36 within global promotion facility 32, as discussed further below with reference to FIG. 7.

Running above hypervisor 170 are operating systems 28 and application programs 172. As well understood by those skilled in the art, each operating systems 28 allocates resources from the pool of resources allocated to it by hypervisor 170 to various operating system processes and applications 172, independently controls the operation of the hardware allocated to its partition, and provides various application programing interfaces (API) through which operating system services can be accessed by its application programs 172. Application programs 172, which can be programmed to perform any of a wide variety of computational, control, communication, data management and presentation functions, comprise a number of user-level processes 174.

Figure 7:
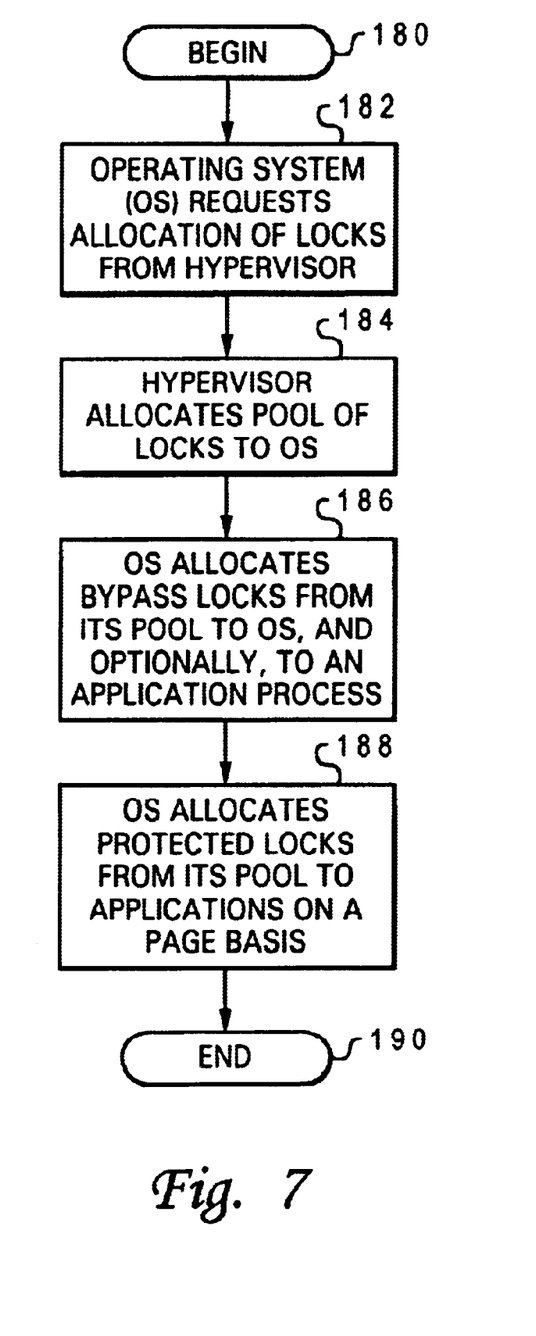
FIG. 7 depicts a high level logical diagram of a method by which memory-mapped resources, such as a global promotion facility, maybe allocated by software.

With reference now to FIG. 7, there is depicted a high level logical flowchart of a method by which memory-mapped resources, such as promotion bits 36 within a global promotion facility 32, may be allocated. The process depicted in FIG. 7, which is performed individually by each operating system 28, assumes (but does not require) the exemplary software configuration illustrated in FIG. 6.

As shown, the process begins at block 180 after booting of data processing system 8 and then proceeds to block 182, which illustrates an operating system 28 requesting an allocation of locks from hypervisor 170. The request may specify, for example, a requested number of locks. As shown at block 184, in response to the request (and requests from other operating systems 28), hypervisor 170 allocates a pool of locks (i.e., particular promotion bits 36) to the operating system 28 from global promotion facility 32. Hypervisor 170 may allocate all of promotion bits 36 as locks, or as noted above, may allocate some of promotion bits 36 as locks and reserve other promotion bits 36 for other types of inter-component coordination.

The process proceeds from block 184 to blocks 186 and 188, which illustrates operating system 28 allocating locks from its pool. In accordance with a preferred embodiment of the present invention, operating system 28 can allocate at least two types of locks from its pool: bypass locks and protected locks. Bypass locks are herein defined as locks that can be accessed by a process without implementation of access protection, thus bypassing the access protection typically performed by address translation facilities. Conversely, protected locks are herein defined as locks that can be accessed by a process only in conjunction with access protection.

As shown in block 186, operating system 28 allocates bypass locks from its pool to operating system (e.g., kernel) processes, and optionally, to applications 172. The bypass locks allocated by an operating system 28 to applications 172 are each preferably allocated to a single process (e.g., the application root process) per application to promote well-behaved applications. Operating system 28 also allocates protected locks from its pool to applications 172, preferably as a fixed number of protected locks per page of non-real (e.g., virtual) address space allocated to the application 172. The number of locks per virtual memory page can be determined by operating system 28, or alternatively, by mode bits 42 (see FIG. 1) within a processor core 14 to permit hardware to optimize lock allocation. As will be appreciated by those skilled in the art, it is preferable for multiple locks to be allocated on each page to avoid unnecessarily rolling the translation lookaside buffer (TLB) as different locks are accessed. Following allocation of the bypass locks and protected locks, the process illustrated in FIG. 7 terminates at block 190.

Figure 8:
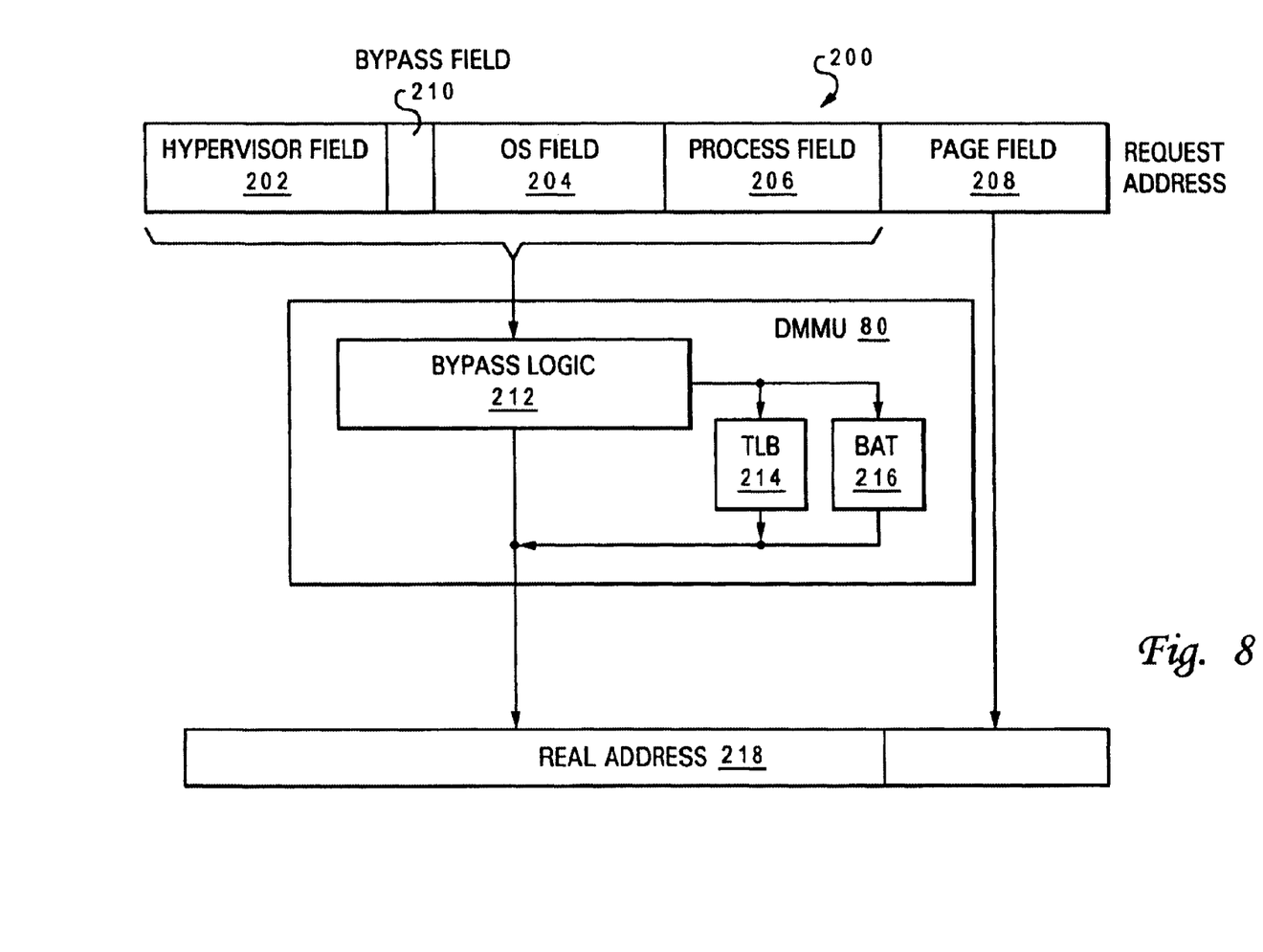
FIG. 8 illustrates a method by which access protection and address translation may be bypassed to accelerate accesses to particular memory-mapped resources, such as a global promotion facility.

Referring now to FIG. 8, there is illustrated a more detailed block diagram of DMMU 80 of FIGS. 2A and 2B, which depicts the manner in which access requests for memory-mapped resources, such as global promotion facility 32, are accelerated when access protection is bypassed. As shown, DMMU 80 includes bypass logic 212 coupled to address translation facilities that include translation lookaside buffer (TLB) 214 and a block address table (BAT) 216. As is well known to those skilled in the art, TLB 214 is a cache of recently referenced page frame table (PFT) entries that are accessed to translate non-real (e.g., effective or virtual) addresses within uniform pages of a virtual address space into real addresses. BAT 216 similarly translates non-real addresses into real addresses by reference to cached table entries, but is utilized to translate non-real addresses falling within non-uniform (rather than uniform) blocks of the virtual address space. Both of TLB 214 and BAT 216 provide access protection through access protection bits (often referred to as WIMG bits for PowerPC-based processors) within the PFT entries.

As shown in FIG. 8, DMMU 80 receives a request address 200 to access a memory-mapped resource from LSU 66 (and/or BEU 62 in the embodiment of FIG. 2B). Request address 200 includes a lower order portion containing page field 208 and a higher order portion including hypervisor field 202, OS field 204 and process field 206. Hypervisor field 202, OS field 204 and process field 206 are generally determined by hypervisor 170, an operating system 28, and a process (e.g., application process 174) according to the real and/or virtual address spaces allocated to and controlled by each piece of software. Within OS field 204, a bypass field 210 is provided that can be set to a bypass state (e.g. a "1") by any application or operating system process that has been allocated a bypass lock when request address 200 specifies a bypass lock allocated to that process.

In response to receipt of request address 200, bypass logic 212 determines by reference to bypass field 210 whether or not the access request should be permitted to bypass the access protection provided by TLB 214 and BAT 216. If so, request address 200 can be transmitted as real address 218 directly to the memory-mapped resource (e.g., promotion cache 20 or system memory 26) to initiate an access. Thus, request addresses 200 having bypass field 210 set to the bypass state bypass both address translation and access protection, reducing access latency for the associated access requests by at least one (and typically more) processor cycles. In the event that bypass field 210 of a request address 200 is not set to the bypass state, signifying the need for address translation and access protection, the higher order portion of request address 200 comprising hypervisor field 202, OS field 204 and process field 206 is translated by reference to TLB 214 or BAT 216 to obtain the higher order portion of real address 218. Concurrent with the address translation, TLB 214 or BAT 216 implements access protection to ensure that the process issuing the access request is permitted to access to the requested lock. Thereafter, DMMU 80 transmits real address 218 to initiate access to the memory-mapped resource.

Although FIGS. 7-8 have been described with specific reference to locks, and more generally, with respect to memory-mapped global promotion facilities, it should be appreciated that the techniques described with reference to FIGS. 7 and 8 can generally be applied to accelerate access to any memory-mapped facility whether or not it resides within a memory device.

While the invention has been particularly shown and described with reference to a preferred embodiment, it will be understood by those skilled in the art that various changes in form and detail may be made therein without departing from the spirit and scope of the invention. For example, although the present invention has been described with reference to particular embodiments in which promotion bits are employed as locks, it should be understood that the present invention is not limited to such embodiments, but is instead broadly applicable to inter-component coordination in a multiprocessor data processing system. In addition, although in some instances, the description of the present invention assumes that certain promotion bits must be held exclusively (e.g., certain locks), it should be understood that the notion of promotion includes the ability of multiple components to concurrently hold a particular promotion bit and therefore be able to perform activities associated with the promotion bit. Furthermore, the exclusivity of selected promotion bits can localized, for example, in a particular cluster of processing units or on a particular one of a plurality of hierarchical buses.

Moreover, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of allocating memory-mapped facilities within a data processing system, said method comprising:
    allocating a pool of facilities to an operating system, wherein each facility within the pool of facilities has an associated real address;
    the operating system allocating from the pool at least one bypass facility to a first process that the first process is permitted to directly access by its associated real address without first obtaining translation of a non-real address; and
    the operating system allocating from the pool at least one protected facility to a second process that the second process accesses only by translation of a non-real address to obtain the real address associated with the protected facility.

2. The method of claim 1, wherein the data processing system includes a plurality of concurrently running operating systems, and wherein said step of allocating a pool comprises an operating system supervisor allocating a respective one of a plurality of pools of facilities to each of the plurality of operating systems.

3. The method of claim 1, wherein the step of allocating from the pool at least one bypass facilities to a first process comprises the operating system allocating the bypass facility to an application program process.

4. The method of claim 1, wherein the step of allocating from the pool at least one protected facility comprises the operating system allocating a same number of facilities within each virtual memory page allocated to the second process.

5. The method of claim 4, and further comprising said operating system determining said same number of facilities by reference to a hardware mode bit.

6. The method of claim 1, wherein:
    said pool of facilities comprises a pool of global promotion facilities; and
    allocating a pool of facilities to an operating system comprises allocating a pool of global promotion facilities to an operating system.

7. The method of claim 6, wherein:
    said pool of global promotion facilities comprises a pool of locks; and
    allocating a pool of global promotion facilities to an operating system comprises allocating a pool of locks to an operating system.

8. A method of accessing memory-mapped facilities within a data processing system, said method comprising:

receiving a request address of a request to access a memory-mapped facility, said request address including a bypass field;
    determining by reference to said bypass field whether access to said memory-mapped facility should be protected;
    in response to a determination that access to said memory-mapped facility should be protected, translating said request address to a obtain a real address utilizing a translation facility that employs protection; and
    in response to a determination that access to said memory-mapped facility does not require protection, bypassing said translation facility and accessing said memory-mapped facility utilizing said request address as a real address.

9. The method of claim 1, wherein said receiving a request address comprises receiving a request address of a request to access a global promotion facility.

10. The method of claim 9, wherein said receiving a request address comprises receiving a request address to access a lock facility.

11. The method of claim 8, wherein translating said request address utilizing a translation facility comprises translating said request address utilizing a translation lookaside buffer.

12. A data processing system, comprising:
    execution resources; and
    an address translation facility that translates non-real addresses into real addresses; and
    storage including:
        a physical memory containing a plurality of storage locations each having associated therewith a respective one of a plurality of real addresses;
        an operating system that allocates, from a pool of memory mapped facilities in which each facility has an associated real address, at least one bypass facility to a first process that the first process is permitted to directly access by its associated real address without first obtaining translation of a non-real address, and wherein the operating system allocates from the pool at least one protected facility to a second process that the second process accesses only by translation of a non-real address to obtain the real address associated with the protected facility.

13. The data processing system of claim 12, wherein:
    the operating system comprises one of a plurality of operating systems within the storage;
    said execution resources comprises a plurality of processing units that concurrently execute the plurality of operating systems; and
    said storage further comprises an operating system supervisor executed by said execution resources, wherein said operating system supervisor allocates a respective one of a plurality of pools of facilities to each of the plurality of operating systems.

14. The data processing system of claim 12, said storage further including an application program including one or more application processes, said one or more application processes including the first process.

15. The data processing system of claim 12, said non-real addresses comprising virtual addresses within a virtual address space comprising a plurality of virtual memory pages, wherein the operating system allocates a same number of facilities within each virtual memory page allocated to the second process.

16. The data processing system of claim 15, and further comprising hardware mode bits coupled to said execution resources, wherein said operating system determines said same number of facilities by reference to the hardware mode bits.

17. The data processing system of claim 12, wherein said pool of facilities comprises a pool of global promotion facilities within said memory.

18. The data processing system of claim 17, wherein said pool of global promotion facilities comprises a pool of locks.

19. A data processing system, comprising:

execution resources;

a translation facility that translates non-real to real addresses and implements access protection; and bypass logic coupled between said execution resources and said translation facility, wherein said bypass logic, responsive to receipt of a request address of a request to access a memory-mapped facility, said request address including a bypass field, determines by reference to said bypass field whether access to said memory-mapped facility should be protected, wherein said bypass logic, responsive to a determination that access to said memory-mapped facility should be protected, passes said request address to said translation facility for access protection and translation into a real address prior to access of said memory-mapped facility, and wherein said bypass logic, responsive to a determination that access to said memory-mapped facility does not require protection, bypasses said translation facility and transmits said request address to said memory-mapped facility as a real address.

20. The data processing system of claim 19, and further comprising the memory-mapped facility, wherein the comprises a global promotion facility.

21. The data processing system of claim 20, wherein global promotion facility comprises a lock facility.

22. The data processing system of claim 19, wherein said translation facility comprises a translation lookaside buffer.

23. The data processing system of claim 19, and further comprising a memory including the memory-mapped facility.

24. A program product, comprising:

a data processing system usable medium; and an operating system for a data processing system encoded within said medium, wherein said operating system allocates, from a pool of memory mapped facilities in which each facility has an associated real address, at least one bypass facility to a first process that the first process is permitted to directly access by its associated real address without first obtaining translation of a non-real address, and wherein the operating system allocates from the pool at least one protected facility to a second process that the second process accesses only by translation of a non-real address to obtain the real address associated with the protected facility.

25. The program product of claim 24, wherein the first process comprises a process of an application program.

26. The program product of claim 24, said non-real addresses comprising virtual addresses within a virtual address space comprising a plurality of virtual memory pages, wherein the operating system allocates a same number of facilities within each virtual memory page allocated to the second process.

27. The program product of claim 24, wherein said pool of facilities comprises a pool of global promotion facilities within a memory.

28. The program product of claim 27, wherein said pool of global promotion facilities comprises a pool of locks.

* * * * *